Sept. 13, 1932.  C. R. ROGERS ET AL  1,877,592
TANDEM DISK HARROW
Filed Sept. 23, 1929    2 Sheets-Sheet 1
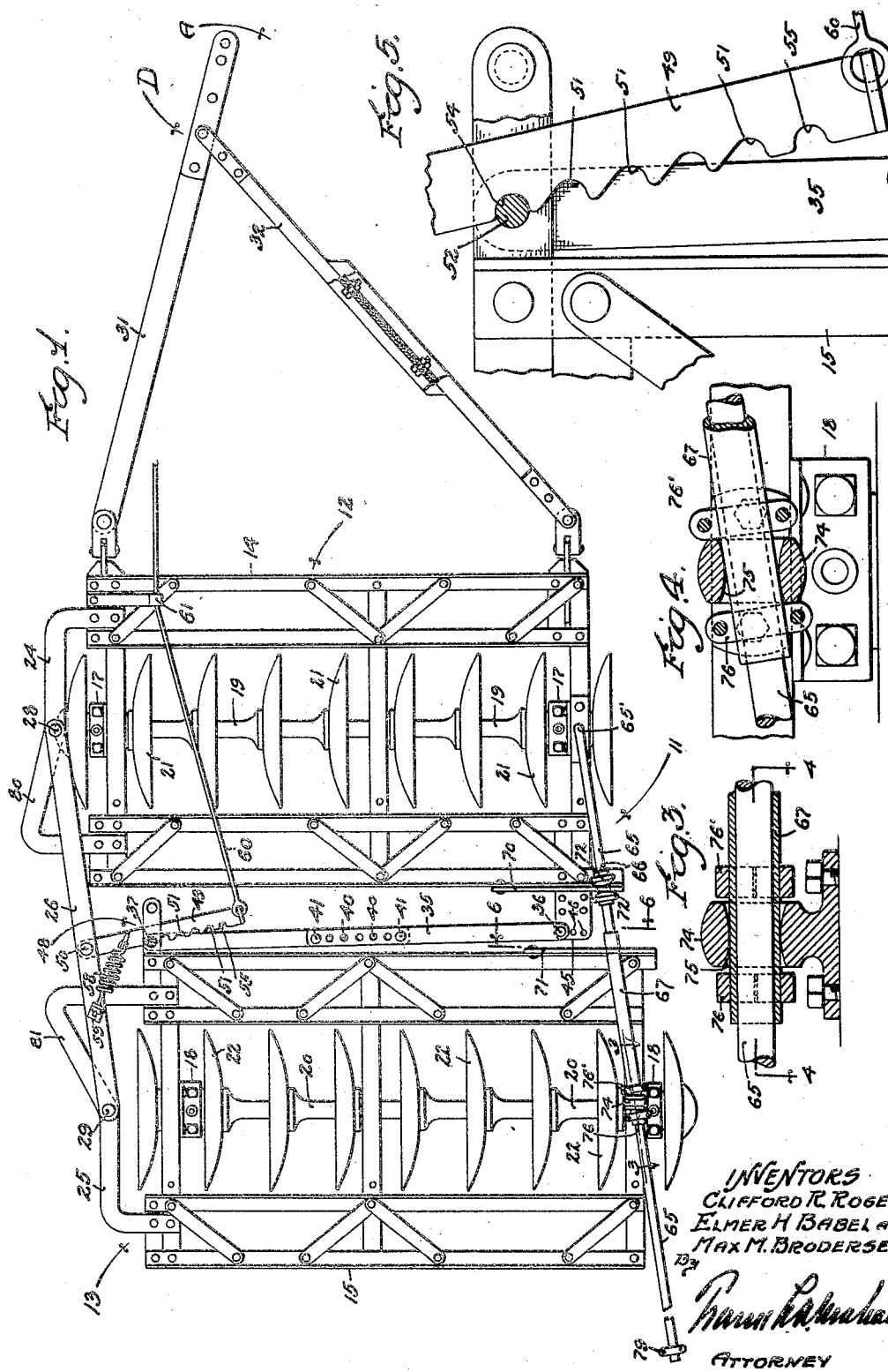
INVENTORS
CLIFFORD R. ROGERS
ELMER H BABEL AND
MAX M. BRODERSEN
ATTORNEY

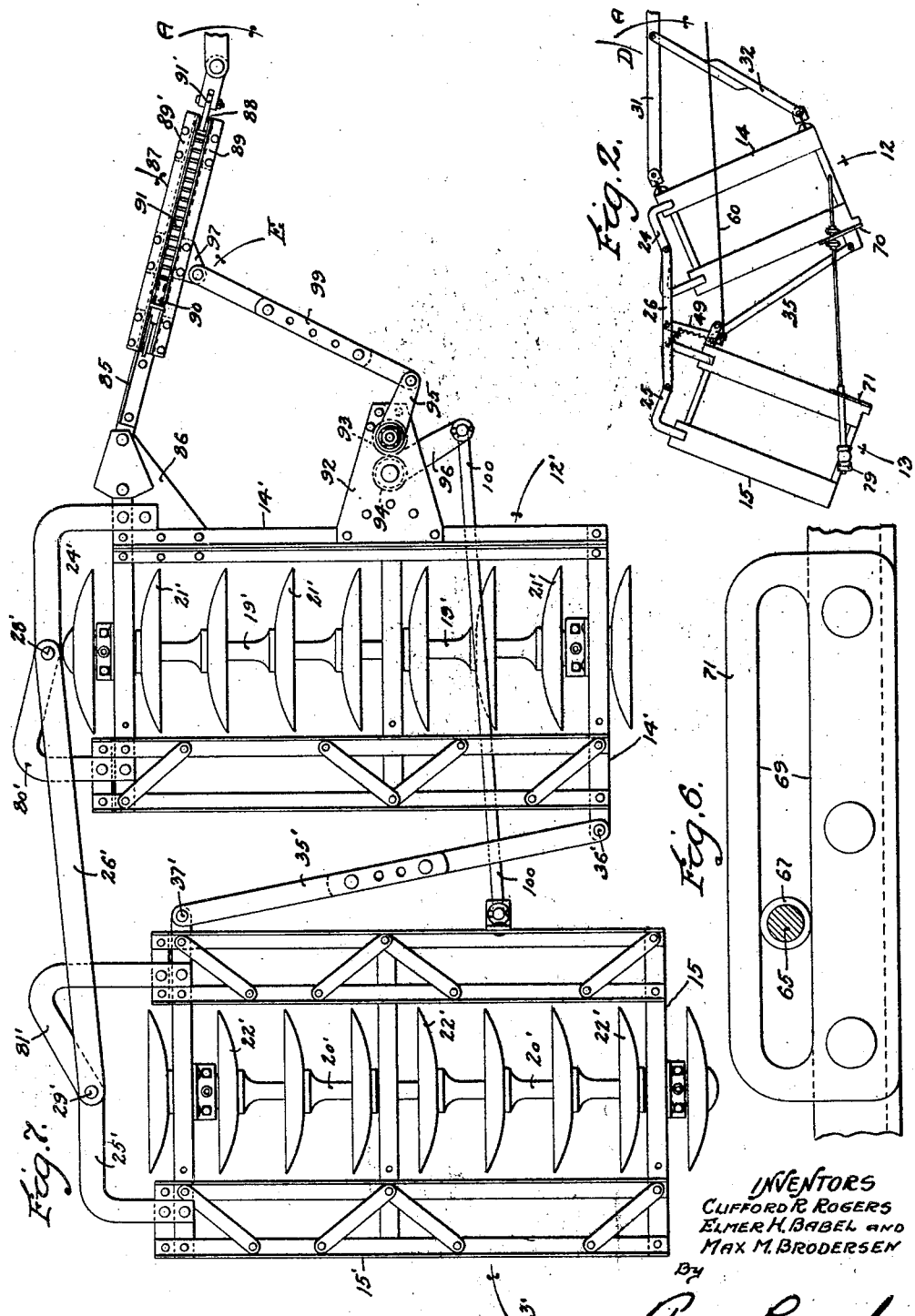

Patented Sept. 13, 1932

1,877,592

UNITED STATES PATENT OFFICE

CLIFFORD R. ROGERS, OF LOS ANGELES, ELMER H. BABEL, OF ALHAMBRA, AND MAX M. BRODERSEN, OF MONTEREY PARK, CALIFORNIA, ASSIGNORS TO KILLEFER MANUFACTURING CORPORATION, A CORPORATION OF CALIFORNIA

TANDEM DISK HARROW

Application filed September 23, 1929. Serial No. 394,712.

This invention has to do with disk harrows or disk cultivators, and contemplates certain improvements in the construction of offset or tandem disk harrows, designed to increase the ease of operation and the cultivating efficiency of such units.

The offset disk harrow has been developed primarily for the purpose of cultivating orchards or the like, where the harrow must, to produce the desired results, be drawn to one side of the power unit, so that the soil beneath the foliage of the trees may be cultivated while the tractor is maintained in a position between the rows of trees.

It is a primary object of this invention to produce an offset disk harrow in which means are provided for the positive movement of the rear gang when the front gang is moved, irrespective of the condition of the soil in which the disk is operated. Such a construction not only facilitates the operation of the disk and renders it adapted for use under varying soil conditions, but it also provides means for drawing the gangs into parallel relation with each other.

It is also an object of this invention to produce an offset disk harrow of the class described, in which the side draft on the tractor or power unit used in operating the harrow is reduced to a minimum.

It is a further object of this invention to provide means for varying the offset position of the two gangs to obtain the correct cultivating efficiency for each working angle which the disks may assume. Such means are associated with the means referred to above for positively angling the disks.

Another feature which has received consideration in the production of the disk harrow contemplated by this invention is the fact that there is no single point away from which the two gangs can diverge which will give the same cultivating efficiency for all working angles; in other words, it is impossible to obtain the most efficient cultivating action with a two gang disk harrow in which the disks must necessarily always converge to the same fixed point.

It has been our observation that for the most efficient cultivating action through each of the various working angles which the gangs of a harrow of this character may assume, there is a corresponding point toward which the gangs must converge, and that each of these points is different for each working angle. We have, therefore, produced a disk harrow of the class described in which the two gangs, instead of being connected to each other at one side by a single fixed pivot point, are each pivotally connected to a draft bar, so that the gangs, instead of converging to a single point for all working angles, converge to a plurality of points according to the divergent angle assumed by the gangs.

It is important in the construction of a disk harrow of this character, wherein the gangs are connected in the manner mentioned above, to provide means for preventing the uncontrolled movement of the rear gang, and, as will be observed from the following description, the rear gang control link which is used to produce the positive rear gang angular movement mentioned above, also serves the purpose of preventing the uncontrolled movement of the rear gang, due to the throw of the ground against the concave surfaces of the disks in the rear gang.

It is still another object of this invention to produce a device of the class described in which the working angle of the disks may be readily adjusted from the seat of the tractor until the proper working angle has been found, and in order that the forces through the unit may be properly distributed and in order that the side draft on the tractor may be reduced to a minimum, we provide additional means for setting and holding the gangs in the proper working angle after such angle has once been determined.

The invention also contemplates the provision of means for maintaining the frames of the two gangs in substantially the same horizontal plane.

The harrow contemplated by this invention is of simple form and construction and it may be economically manufactured and easily operated and adjusted to suit various soil conditions. It may be turned either to the right or the left, since the two gangs may be readily drawn into parallel relation with each other simply by backing the tractor or power unit a short distance or by turning the unit a short distance away from the side to which the draft means are attached.

The details in the construction of a preferred form of the invention, together with other objects attending its production will be best understood from the following description of the accompanying drawings, in which Fig. 1 is a plan view of an offset disk harrow embodying our invention.

Fig. 2 is a diagrammatic view of the form of invention shown in Fig. 1, and illustrating the gangs as being positioned in an extreme working angle.

Fig. 3 is a sectional elevation, showing the sliding hold-down bar connection, and may be considered as having been taken substantially in the plane represented by the line 3—3 in Fig. 1.

Fig. 4 is a plan section which may be considered as having been taken substantially in the plane represented by the line 4—4 of Fig. 3.

Fig. 5 is an enlarged partial plan view, showing a preferred form of angle control latch which is used in the manner referred to above for controlling the working angle of the gangs from the seat of the tractor.

Fig. 6 is an enlarged partial sectional elevation, showing a preferred form of hold-down bar guide member, and may be considered as having been taken substantially in the plane represented by the line 6—6 in Fig. 1, and Fig. 7 is a plan view similar to Fig. 1, but showing a modified form of our invention.

More particularly describing the invention as herein illustrated, reference numeral 11 indicates an offset disk harrow comprising a front gang 12 and a rear gang 13. The gangs 12 and 13 each consist of frame members 14 and 15 respectively, provided with bearing blocks 17 and 18 respectively, which, in turn, carry shafts 19 and 20, the shafts being provided with a plurality of disks 21 and 22.

The frames 14 and 15 have provided upon corresponding sides, bracket members 24 and 25, and these sides of the two frames are attached to each other through the medium of a draft bar 26, the opposite ends of which are pivotally attached to the bracket members 24 and 25, as indicated at 28 and 29 respectively.

The front gang 12 is provided with draft means, shown as being in the form of a triangular frame D, the main tongue member 31 of which is attached to the frame 14 at the side to which the draft bar 26 is attached.

The brace or stay member 32 of the draft frame D is adjustably attached to the front end of the tongue 31, and the rear end of the member 32 is attached to the front end of the frame 14 at the side opposite to which the draft bar 26 is attached.

It will be understood from the construction so far described that, if a pulling force were applied to the front gang 12 through the medium of the draft member D, the throw of the ground against the concave sides of the disks 21 and 22 would, if the soil conditions were proper, force the gangs into converging angle position. Such position would depend entirely upon the condition of the soil and in a heavy soil the tendency would be for the rear gang to be swung about until it was substantially parallel to the main draft member 31. On the other hand, if the soil were very hard, there would be practically no tendency for the gangs to diverge and the unit would be drawn forward with the two gangs in substantially parallel relation with each other. It is therefore necessary for the proper operation of a unit of this character to provide means for positively moving the rear gang into converging relation with the front gang when a pulling force is applied to the draft member D. Such means are shown as being in the form of a rear gang control link 35, which is diagonally arranged between the two gangs and has its opposite ends 36 and 37 attached to diagonally opposed corners of the front gang frame 14 and the rear gang frame 15 respectively.

It should be observed that the rear gang control link 35 is pivotally attached to the front end of the rear gang at the same side to which the draft bar 26 is attached, and is pivotally connected to the rear end of the front gang at the side opposite to which the draft bar 26 is attached. With this construction, it will be apparent that when a forward or pulling force is applied to the draft member D, the front gang 12 is swung into an angular position due to the unbalanced structure of the draft triangle whereby the front gang is attached to the tractor, and that this swinging movement is immediately effective to pull the front left hand corner of the rear gang away from the position shown in Fig. 1 to the position shown in Fig. 2. Likewise, if the gangs have assumed a working angle, such as is shown in Fig. 2, a rearward force applied to the draft member D or a force applied in the direction of the arrow A in Fig. 2 will be effective to throw the front left-hand corner of the rear gang toward the position shown in Fig. 1.

It will be seen, therefore, that the rear gang control link 35 affords means for positively controlling the movement of the rear gang through and in connection with the movement of the front gang.

It has been previously mentioned as an object of this invention to provide means for varying the offset relation between the two gangs to obtain the proper position of the rear gang with respect to the front gang for a given working angle. This may be accomplished by varying the length of the rear gang control link 35, and for this reason the link 35 is made in two sections, each provided with a series of apertures 40, adapted to receive bolts 41 so that the link as a unit may be lengthened or shortened to obtain the desired relation between the front and rear gang. A similar effect may also be obtained by varying the location of the pivot 36 and for this reason the front gang frame 14 is shown as being provided with a pivot plate 45, which contains a plurality of pivot apertures 46, which may be employed for changing the position of the pivot point 36.

It was also mentioned as an object of this invention to provide means for adjustably varying the working angle of the gangs from a remote point, such as the driver's seat of the tractor. Such means are illustrated as being in the form of an angle control latch 48, which is illustrated as comprising a lever 49, pivotally attached to the draft bar 26, as indicated at 50. The lever 49 is shown as being provided with a plurality of notches 51, adapted to receive a projection or a pin 52, which is mounted upon the rear gang frame 15. (See Fig. 5.)

It will be noted from Fig. 5 that the lever 49 is provided with two symmetrical notches 54 and 55, situated at opposite ends of a series of notches 51. The symmetrical notches 54 and 55 hold the lever in fixed positions when the pin 52 is received therein, but the notches 51, while they prevent divergence of the gangs when occupied by the pin 52, are adapted to permit the convergence of the gangs when a unit such as the one shown in Fig. 1 is being turned to the right.

It will be understood that the location of the pin or projection 52 may be varied from the position shown in Fig. 1, and, if desirable, this pin may be located upon a specially extended arm which extends outside of the draft bar 26, in which event the lever 49 must be turned through 180° from the position shown in Fig. 1. We consider it preferable, however, in order to facilitate the operation of the angle control latch and to add to the compactness of the unit, to arrange this latch in the manner shown. This arrangement has a further advantage in that the pin 52 serves the dual purpose of acting as a pivot for the connection of the rear gang control link 35 to the rear gang and as a stop for the lever 49.

It will thus be seen that this construction gives a direct transmission of force from the control link 35 to the draft bar 26, forming a closed force triangle, which tends to decrease the side draft on the tractor unit.

In order that the angle control latch 48 will always be returned to a latching or locking position, we provide the lever 49 with a coil spring 58, the outer end of which is shown as being adjustably received in the bracket 59 which is mounted upon the draft bar 26.

The movement of the control lever 48 is effected, through the medium of a flexible member such as the cable 60, which is attached to the outer end of the lever and extends through a guide bracket 61 to the seat of the tractor, by means of which the unit is drawn.

In order that the draft bar 26 and the lever 48 may not be required to stand all of the strain to which these members would otherwise be subjected while the harrow is being operated in angular position, we provide additional means which may be adjusted to receive this strain when the proper working angle has been determined. Such means, which we mentioned above as serving the additional function of holding the two gang frames in substantially the same horizontal plane comprises a hold-down bar 65, the front end 65′ of which is shown as being pivotally attached to the central portion of the front gang frame 14 at the side opposite to which the draft bar 26 is attached. The hold-down bar 65 extends through a forward sleeve 66 and a rearward sleeve 67, each of which extends through a slot 69 formed in front and rear hold-down bar guide plates 70 and 71 respectively.

The front sleeve 66 is held against lateral movement along the hold-down bar 65 by means of clamp rings 72. The rear sleeve 67 is positioned with its rear end in a collar member 74, which is rigidly mounted upon the central portion of the rear gang frame 15 at or near the side opposite to which the draft bar 26 is attached and is shown as being provided with a centrally restricted throat 75, so formed as to permit angular movement of the sleeve 67 therein.

The rear end portion of the sleeve 67 is shown as being provided with clamping rings 76 and 76′, positioned on opposite sides of the collar 74 for the purpose of preventing lateral movement of the sleeve 67 therethrough.

The rear end portion of the hold-down bar 65 is provided with an adjustable stop clamp 79, which may be positioned as indicated in Fig. 2 so as to engage the rear end portion of the sleeve 67 when the two gangs have assumed the proper working angle.

In operating the unit shown in Fig. 1, a tractor or other suitable source of power is attached to the front end of the main draft member D. The angular control latch 48 is opened by pulling the cable 60 and the unit is drawn forward by means of the tractor.

It is, of course, necessary in starting the cultivating of a piece of ground to first determine the proper working angle for the gangs, and this is generally done by releasing the latch member 48 in each of the respective notches 51, such releasing operation being effective to stop the angular movement of the gangs in various intermediate positions. When the proper angle has been found, the stop clamp 79 is moved forward so that it engages the rear end of the sleeve 67 just before the pin 52 has reached a position opposite to the notch in which the proper working angle was obtained. From this time on, the stop 79 is effective to determine the working angle and to receive the pulling strain transmitted to the rear gang from the front gang during the operation of the unit.

When a unit such as the one shown in the drawings is being turned to the left, the gangs are left in angular position, but when it is desired to turn the unit to the right the latch 49 is opened and the turning force applied to the draft member D is effective in the manner indicated above to swing the gangs into parallel relation with each other, after which the unit may be readily turned about a point on the side opposite to which the draft means are attached. When it is desired to place the two gangs in parallel or inoperative position for the purpose of moving the unit over a hard road surface or for backing the unit, this may be accomplished by opening the control latch and applying a rearward force to the draft member D or by pulling the draft member D to the right in the direction of the arrow A in Figs. 1 and 2.

Another point which should receive careful consideration is the particular construction of the frames 24 and 25. It will be noted that these frames are provided with angular projections or extensions 80 and 81, which engage the draft member 26 and assist the hold-down bar 65 in maintaining the two gang frames in substantially parallel relation with each other.

Fig. 7 shows a modified form of our invention in which the parts identical with those described in connection with Fig. 1 are indicated by the same reference numerals, distinguished by the prime mark. It will be noted in this form of the invention that the two gangs 12' and 13' are connected with each other by means of a draft bar 26', the opposite ends of which are pivotally attached to corresponding sides of the two gang frames 14' and 15'. In this form of our invention, instead of using a triangular draft member D, we employ an adjustable draft member indicated by reference character E.

This draft connection E is substantially the same as the one shown and described in connection with the tandem harrow shown in our co-pending application, Serial No. 387,927 filed August 23rd, 1929, and is constructed in a manner such that the rear gang 13' may be controlled entirely independently of the front gang 12'; in other words, this form of the tandem harrow is constructed in a manner such that the front gang may, if desired, be held stationary and the rear gang moved into a working angle or drawn into parallel relation with the front gang merely by the angular movement or a sliding movement of the draft member.

A preferred form of a draft unit which is used in accomplishing this result consists of a draw bar 85, which is pivotally attached to a draw plate 86 mounted upon the forward end of the front gang frame 14' at the side to which the inter-connecting draft bar 26' is mounted.

Slidably mounted upon the draw bar 85 is a sliding draft member 87, which is shown as comprising a bottom plate 88, side flanges 89 and 89', and is provided with a dog or ratchet member 90, adapted to engage rack teeth 91 formed upon the upper surface of the outer end of the draw bar 85.

The forward end of the sliding draft member 87 is provided with a clevis or draft connection plate 91', through which it is attached to the tractor or power unit used in operating the harrow.

Mounted upon the forward end of the front gang frame 14' at an intermediate point is what we may term a tongue member or tongue plate 92. This plate unit carries two intermeshing gears 93 and 94, each of which is rigidly associated with lever members 95 and 96.

The outer end of the lever member 95 is connected to an intermediate point 97 on the sliding draft member 87 by means of an adjustable connecting link 99, and from this construction it will be seen that the sliding movement of the draft member 87 upon the draw bar 85, or a swinging movement of the draw bar 85 is effective to impart rotative movement to the lever 95 and consequent rotative movement in opposite directions to the lever 96. In order that this movement of the lever 96 may be effective to control the movement of the rear gang 13', we connect the outer end of the lever 96 to an intermediate point on the forward end of the rear gang frame 15' through the medium of a secondary or gang control bar 100.

From this construction, it will be readily apparent that either the swinging movement of the draw bar 85 or the sliding movement of the draft member 87 thereon is effective to control the angular movement of the rear gang 13' independently of the front gang 12'.

In the operation of the unit shown in Fig. 7 the first step is, of course, to draw the tandem harrow forward through the medium of the draw bar 85, and in order that such movement may be effective to start the gangs at their proper working angle, the dog or ratchet 90 is released, permitting the sliding draft member 87 to advance relative to the draw bar 85 and, consequently effect a positive angling movement of the two gangs relative to each other. This angling movement is carried to a point at which the proper working angle is reached, at which time the dog 90 is released, thus locking the sliding draft member 87 with respect to the draw bar 85 and fixing the working angle of the two gangs.

It is necessary, of course, in a construction of this nature to provide a rear gang control link 35′, which extends diagonally between opposite corners of the front and rear gang, the same as the rear gang control link 35, which was described in connection with Fig. 1, and it is to be understood that the secondary rear gang control link 100 not only acts to positively control the movement of the rear gang with the movement of the draft member, but that this unit is also constructed in a manner such that it will function more or less as a hold-down bar, so that it is, to a certain extent, the equivalent of the hold-down bar 65 shown and described in connection with Fig. 1.

It will be apparent, therefore, that both of these forms of our invention comprise gangs 12 and 13 or 12′ and 13′, corresponding sides of which are connected to one another by means of a floating draft bar 26 or 26′ and a rear gang control link 35 or 35′ diagonally interposed between the two gangs and pivotally connected thereto.

It is to be emphasized that the unit is of simple form and construction, that the two gangs are not connected with each other at a single pivot point, but are so connected through the medium of the draft bar as to permit the gangs converging to a plurality of points of different locations according to the working angles of the gangs.

The diagonal rear gang control link affords means for positively effecting an angular movement of the rear gang with the angular movement of the front gang, making the divergence or convergence of the gangs more or less independent of the throw of the soil against the concave surfaces of the disks, and the triangular draft member D cooperates with the draft bar 26 and the hold-down bar 65, with its stop 79, to distribute the forces created in the operation of a tandem disk of this character, so that the side draft upon the power unit is reduced to a minimum.

The unit is adjustable not only to a proper working angle for the particular soil conditions in which it is being used, but also in that the two gangs may be adjusted relative to each other to obtain the proper offset or space relation between the disks of the rear gang and the disks of the front gang for each particular working angle.

It is further emphasized that the angular control latch 48 affords means for readily adjusting the angularity of the gang unit from a remote point, such as the driver's seat of a tractor, and that while this unit may, if desired, be employed to hold the gangs in their working angle position, the hold-down bar 65 and the stop 79 provide means whereby the strain on this latch unit may be relieved after the proper working angle has been found.

It is to be understood that, while we have herein described and illustrated one preferred form of the invention and suggested one modification thereof, the invention is not limited to the precise construction set forth, but includes within its scope whatever changes or modifications fairly come within the spirit of the appended claims.

We claim as our invention:

1. A disk harrow embodying: two gangs arranged in tandem relation; a draft bar connecting corresponding sides of said gangs; a rear gang control link diagonally interposed between said gangs and pivotally connected thereto; and means for controlling the angularity of said gangs.

2. A disk harrow embodying: two gangs arranged in tandem relation; draft means connected to the front gang; a draft bar connecting corresponding sides of said gangs; a rear gang control link diagonally interposed between said gangs and pivotally connected thereto; and means for holding said gangs in working and non-working positions.

3. A disk harrow embodying: two gangs arranged in tandem relation; a triangular draft member connected to the front gang; a draft bar connecting corresponding sides of said gangs; a rear gang control link diagonally interposed between said gangs and pivotally connected thereto; and means for holding said gangs in working and non-working positions.

4. A disk harrow embodying: two gangs arranged in tandem relation; a draft bar connecting corresponding sides of said gangs; a rear gang control link, having one end pivotally connected to one side portion of the front gang and having the other end pivotally connected to the diagonally opposite side of the rear gang; and means for holding said gangs in working and non-working positions.

5. A disk harrow embodying: two gangs arranged in tandem relation; a draft bar connecting corresponding sides of said gangs; a rear gang control link having one end portion pivotally connected to a rear corner of the front gang and having the other end portion pivotally connected to the diagonally opposite front corner of the rear gang; and means for holding said gangs in working and non-working positions.

6. A disk harrow embodying: two gangs arranged in tandem relation; a draft bar connecting corresponding sides of said gangs; a rear gang control link diagonally interposed between said gangs and pivotally connected thereto; means for adjusting the length of said control link to vary the offset relation between said gangs; and means for holding said gangs in working and non-working positions.

7. A disk harrow embodying: two gangs arranged in tandem relation; a draft bar connecting corresponding sides of said gangs; a rear gang control link diagonally interposed between said gangs and pivotally connected thereto; a hold-down bar pivotally attached to one of said gangs and slidably mounted on the other of said gangs; and means for holding said gangs in working and non-working positions.

8. A disk harrow embodying: two gangs arranged in tandem relation; a draft bar connecting corresponding sides of said gangs; a rear gang control link diagonally interposed between said gangs and pivotally connected thereto; a hold-down bar pivotally attached to one of said gangs at the side opposite to which the draft bar is attached and slidably mounted on the other gang at the side opposite to which the draft bar is attached; and means for holding said gangs in working and non-working positions.

9. A disk harrow embodying: two gangs arranged in tandem relation; a draft bar connecting corresponding sides of said gangs; a rear gang control link having one end portion pivotally connected to the front of the rear gang adjacent the side to which the draft bar is attached and having an opposite end portion pivotally connected to the rear of the front gang adjacent the side opposite to which the draft bar is attached; and means for holding said gangs in working and non-working positions.

10. A disk harrow embodying: two gangs arranged in tandem relation; a draft member attached to the forward end of the front gang; a draft bar connecting corresponding sides of said gangs; a rear gang control link having one end portion pivotally connected to the front of the rear gang adjacent the side to which the draft bar is attached and having its other end pivotally connected to the rear of the front gang adjacent the side opposite to which the draft bar is attached; and means for holding said gangs in working and non-working positions.

11. A disk harrow embodying: two gangs arranged in tandem relation; a draft bar connecting corresponding sides of said gangs; a rear gang control link diagonally interposed between said gangs and pivotally connected thereto; a hold-down bar pivotally attached to the front gang at the side opposite to which the draft bar is attached and slidably mounted on the rear gang at the side opposite to which the draft bar is attached; and means for holding said gangs in working and non-working positions.

12. A disk harrow embodying: two gangs arranged in tandem relation; a draft bar connecting corresponding sides of said gangs; a rear gang control link diagonally interposed between said gangs and pivotally connected thereto; a hold-down bar pivotally connected with one of said gangs at the side opposite to which the draft bar is attached and slidably mounted on the other gang at the side opposite to which the draft bar is attached; and stop means associated with said hold-down bar for controlling the working angle of said gangs.

13. A disk harrow embodying: two gangs arranged in tandem relation; a draft bar connecting corresponding sides of said gangs; a rear gang control link diagonally interposed between said gangs and pivotally connected thereto; a hold-down bar pivotally attached to the front gang at the side opposite to which the draft bar is attached and slidably mounted on the rear gang at the side opposite to which the draft bar is attached; and a stop member mounted on the rear end portion of said hold-down bar and adapted to engage the rear gang hold-down bar connection for controlling the working angle of said gangs.

14. A disk harrow embodying: two gangs arranged in tandem relation; a draft bar connecting corresponding sides of said gangs; a rear gang control link diagonally interposed between said gangs and pivotally connected thereto; a hold-down bar pivotally attached to one of said gangs slidably mounted on the other of said gangs; and guide means mounted on said gangs and adapted to slidably receive said hold-down bar for holding the frames of said gangs in substantially the same plane; and means for holding said gangs in working and non-working positions.

15. A disk harrow embodying: two gangs arranged in tandem relation; a draft bar connecting corresponding sides of said gangs; a rear gang control link diagonally interposed between said gangs and pivotally connected thereto; slotted guide plates mounted on the rear of the front gang and the front of the rear gang at the side opposite to which the draft bar is attached; sleeves extending through the slots in said guide plates; a hold-down bar extending through said sleeves; means for connecting said hold-down bar to both of said gangs; and means for holding said gangs in working and non-working positions.

16. A disk harrow embodying: two gangs arranged in tandem relation; a draft bar connecting corresponding sides of said gangs; a rear gang control link diagonally interposed between said gangs and pivotally connected thereto; slotted guide plates mounted on the rear of the front gang and the front of the rear gang at the side of the harrow unit opposite to which the draft bar is attached; sleeves extending through the slots in said sleeves; means for pivotally connecting said hold-down bar to the front gang; means for slidably and pivotally connecting said hold-down bar to the rear gang; and means for holding said gangs in working and non-working positions.

17. A disk harrow embodying: two gangs arranged in tandem relation; a draft bar connecting corresponding sides of said gangs; a rear gang control link diagonally interposed between said gangs and pivotally connected thereto; slotted guide plates mounted on the rear of the front gang and the front of the rear gang at the side of the harrow unit opposite to which the draft bar is attached; sleeves extending through the slots in said guide plates; a hold-down bar extending through said sleeves; means for pivotally connecting said hold-down bar to the front gang; means for slidably and pivotally connecting said hold-down bar to the rear gang; and a stop member mounted on the rear end portion of said hold down bar and adapted to engage the rear gang hold down bar connection for controlling the working angle of said gangs.

18. A disk harrow embodying: two gangs arranged in tandem relation; a draft bar connecting corresponding sides of said gangs; a rear gang control link diagonally interposed between said gangs and pivotally connected thereto; slotted guide plates mounted on the rear of the front gang and the front of the rear gang at the side of the harrow unit opposite to which the draft bar is attached; sleeves extending through the slots in said guide plates; a hold-down bar extending through said sleeves; means for pivotally connecting said hold-down bar to the front gang; means for slidably and pivotally connecting said hold-down bar to the rear gang; and a stop member adjustably mounted on the rear end portion of said hold down bar and adapted to engage the rear gang hold down bar connection for controlling the working angle of said gangs.

19. A disk harrow embodying: two gangs arranged in tandem relation; a draft bar connecting corresponding sides of said gangs; a rear gang control link diagonally interposed between said gangs and pivotally connected thereto; slotted guide plates mounted on the rear of the front gang and the front of the rear gang at the side of the harrow unit opposite to which the draft bar is attached; sleeves extending through the slots in said guide plates; a hold-down bar extending through said sleeves; means for pivotally connecting said hold-down bar to the front gang; means for slidably and pivotally connecting said hold-down bar to the rear gang; and a stop member mounted on the rear end portion of said hold-down bar and adapted to engage the rear gang hold-down bar connection for controlling the working angle of said gangs, said rear hold-down bar connection comprising a collar mounted on the rear gang and having a centrally restricted throat adapted to receive the rear end portion of the rear sleeve and stop means on said sleeve for preventing relative lateral movement of said sleeve in said throat.

20. A disk harrow embodying: two gangs arranged in tandem relation; a draft bar connecting corresponding sides of said gangs; a rear gang control link diagonally interposed between said gangs and pivotally connected thereto; and means for adjustably controlling the working angle of said gangs.

21. A disk harrow embodying: two gangs arranged in tandem relation; a draft bar connecting corresponding sides of said gangs; a rear gang control link diagonally interposed between said gangs and pivotally connected thereto; and a working angle control latch comprising a notched lever pivotally mounted on the draft bar and a stop member mounted on the rear gang and adapted to be received by the notches in said lever.

22. A disk harrow embodying: two gangs arranged in tandem relation; a draft bar connecting corresponding sides of said gangs; a rear gang control link diagonally interposed between said gangs and pivotally connected thereto; and a working angle control latch comprising a notched lever pivotally mounted on the draft bar and a stop member mounted on the rear gang and adapted to be received by the notches in said lever, said stop member being situated at the point at which the rear gang control link is connected to said rear gang.

23. A disk harrow embodying: two gangs arranged in tandem relation; a draft bar connecting corresponding sides of said gangs; a rear gang control link diagonally interposed between said gangs and pivotally connected thereto; and a working angle control latch comprising a notched lever pivotally mounted on the draft bar, a stop member mounted on the rear gang and adapted to be received by the notches in said lever, means for holding said lever in yieldable engagement with said stop member, and means for operating said lever from a remote point.

24. A disk harrow embodying: two gangs arranged in tandem relation; a floating draft bar having its opposite end portions attached to corresponding sides of the front and rear gang; draft means attached to the front gang; means for controlling the working angle of said gangs; releasable means for positively locking said gangs in working and non-working positions; and means for holding said gangs against free relative movement as the gangs swing to and from working position.

In testimony whereof, we have hereunto set our hands at Los Angeles, California, this 12 day of Sept., 1929.

CLIFFORD R. ROGERS.
ELMER H. BABEL.
MAX M. BRODERSEN.